United States Patent [19]

Allen

[11] 4,334,037

[45] Jun. 8, 1982

[54] MOULDING COMPOSITIONS OF A STYRENE POLYMER AND PTFE PARTICLES

[75] Inventor: Eric H. W. Allen, Luton, England

[73] Assignee: George Kent Limited, Luton, England

[21] Appl. No.: 261,515

[22] Filed: May 7, 1981

Related U.S. Application Data

[63] Continuation of Ser. No. 49,749, Jun. 18, 1979, abandoned.

[30] Foreign Application Priority Data

Mar. 7, 1979 [GB] United Kingdom ................. 7908122

[51] Int. Cl.³ ....................... C08L 25/06; C08L 27/18
[52] U.S. Cl. .................................................... 525/199
[58] Field of Search ......................................... 525/199

[56] References Cited

U.S. PATENT DOCUMENTS 2,998,397  8/1961  Riesing ................................ 525/199
3,005,795 10/1961  Busse et al. ......................... 525/199
3,074,901  1/1963  Lantos ................................ 525/199
3,294,871 12/1966  Schmitt et al. ...................... 525/199
3,940,455  2/1976  Kaufman ............................. 525/199

FOREIGN PATENT DOCUMENTS 50-119040  9/1975  Japan .
   847861  9/1960  United Kingdom .
   884771 12/1961  United Kingdom .
   975516 11/1964  United Kingdom .

Primary Examiner—Carman J. Seccuro
Attorney, Agent, or Firm—Browdy and Neimark

[57] ABSTRACT

A thermoplastic moulding composition comprises a major proportion of a thermoplastic styrene-based polymeric material having dispersed therein at least 5% by weight, based on the total weight of the composition of PTFE particles. Articles may be moulded from the compositions having good wear properties and which are relatively stable in aqueous environments. Such properties make the compositions of great utility for moulding flow meter pistons.

12 Claims, 7 Drawing Figures

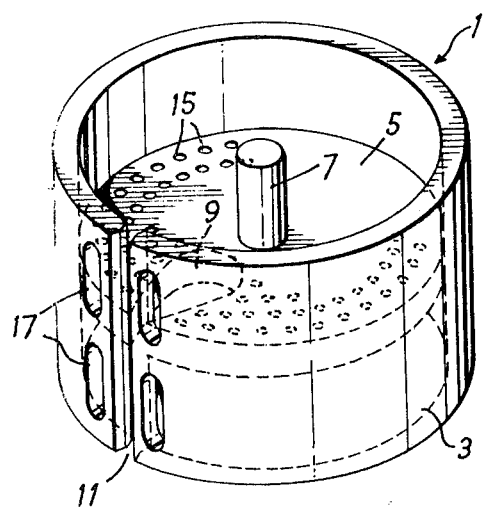
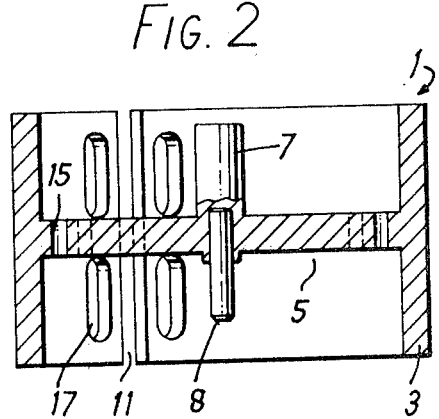
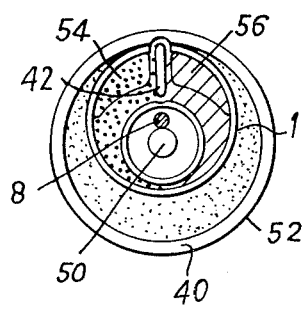
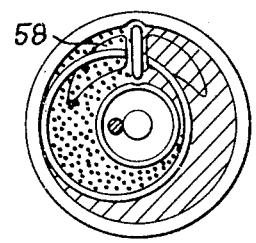
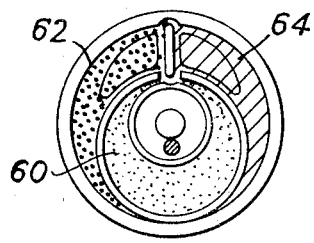
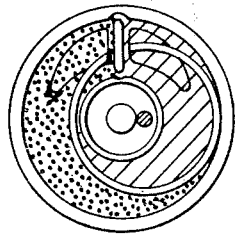

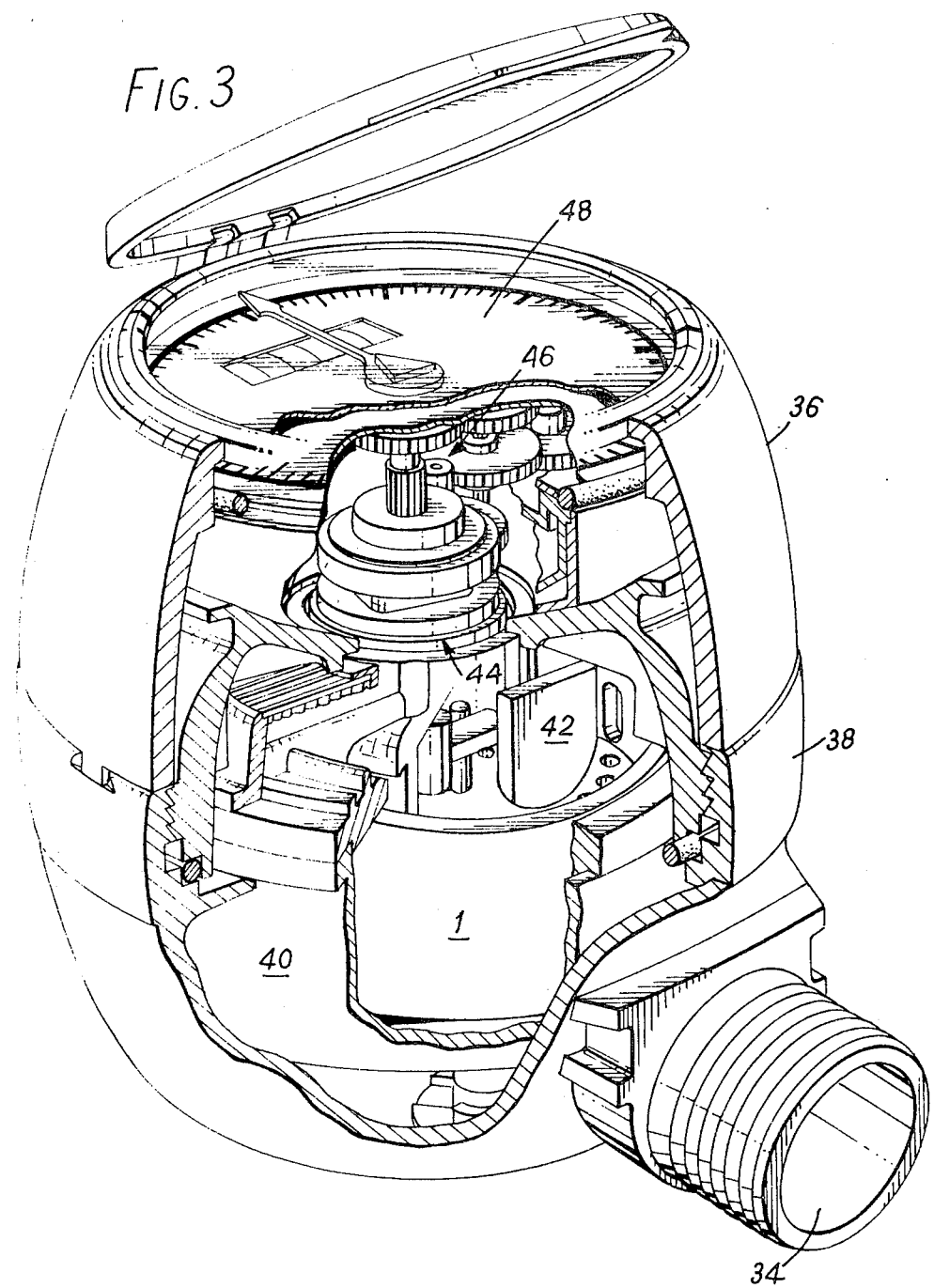

MOULDING COMPOSITIONS OF A STYRENE POLYMER AND PTFE PARTICLES

This is a continuation, of application Ser. No. 49,749 filed June 18, 1979, now abandoned.

This invention relates to thermoplastic moulding compositions and in particular to thermoplastic moulding compositions for forming moulded components intended for use in aqueous environments.

The invention particularly relates to the use of such compositions to form movable parts of fluid flow meters.

Generally in fluid flow meters a movable, e.g. rotatable component located inside a measuring chamber unit is actuated by in-flowing fluid and movement e.g. revolution of the component is detected and the quantity of fluid flowing through the meter estimated from the detected movement. The chamber unit may for example, be formed from metal or moulded thermoplastic. For efficient, accurate functioning of the meter and to ensure a long life thereof both chamber and moving component should be formed of very wear-resistant materials having low coefficients of frictional resistance. The movable component, which may, for example, be a piston or swashplate and also the chamber must be dimensionally stable in water with virtually no water absorption.

At present the movable components of fluid flow meters are manufactured from various different materials, which have various draw-backs. For example, hard rubber such as Ebonite or Vulcanite is widely used and has the required physical properties of dimensional stability in aqueous environments and low coefficients of friction and movable components made from it are very resistant to wear in both metal and plastic chambers. However, the raw material is expensive, and the cost of producing intricately shaped components is high since hard rubber cannot readily be moulded to form such shapes. Thus in practice, since hard rubber cannot be accurately moulded a rough blank is first produced by moulding and subsequent machining operations are necessary which can be time-consuming and expensive to carry out.

Two further materials which have been used are nylon and Noryl (a compound of polyphenylene oxide). Both of these materials are cheaper than hard rubber and can be moulded to form intricate shapes, but their properties are less suitable for the required application. Thus in water even low water adsorption grades of nylon increase in length by at least 0.5%. Similarly components compounded from PPO are stable in water but they are less wear resistant than hard rubber and have greater frictional resistance, resulting in lower metering accuracy at low flow rates.

Experiments were carried out using known moulding compositions to try to find a material suitable for forming movable components of fluid flow meters by moulding, but none was found which fulfilled the requirements of (a) being a thermoplastic composition which can be moulded to a dimensional accuracy of 0.1%; (b) having a stability in aqueous environments such that the change in length of the moulded component due to water absorption is less than 0.1%; (c) the ability to form a component which can function in water up to a temperature of 50° C. and not degrade in tropical conditions; (d) having low frictional resistance and good wear resistance when used in typical chamber units, and (e) having good strength and impact resistance.

We have now developed a moulding composition which enables intricately moulded components, such as movable components of fluid flow meters to be moulded in a straightforward manner and which furthermore satisfies the above requirements to a greater extent than moulding compositions available hitherto.

Thus according to the present invention there is provided a thermoplastic moulding composition comprising a major proportion of a thermoplastic styrene based polymeric material having dispersed therein at least 5% by weight, based on the total weight of the composition of PTFE particles. Preferably, the composition contains between 5 and 30% by weight of PTFE particles. To obtain the combined advantages of cheapness and good wear and frictional resistance for components moulded from the composition the range should be 5 to 15%, and more advantageously 8 to 12%. Generally, the PTFE particles are small, typically having a maximum dimension less than 100 $\mu$m. Preferably the size distribution of the PTFE is such that less than 1% of the particles have a maximum dimension greater than 50 $\mu$m. Preferably the average size range is 1 to 50 $\mu$m, and more preferably 1 to 20 $\mu$m. In order for components moulded from the composition to have particularly good wear and frictional resistance, PTFE particles with average size 2 to 10, preferably 5 to 7 $\mu$m, and not more than 1% larger than 35 $\mu$m are dispersed throughout the styrene, which is preferably a high-impact grade.

Although the precise shape of the particles is not unduly critical, it is to be understood that the PTFE particles used in preparing compositions according to the invention are of a shape such that the maximum transverse dimension of the individual particles does not differ significantly from their minimum dimension. Preferably the length/breadth ratio of each particle is not greater than 2:1, and most preferably is not greater than 1.5:1.

The preferred particles may thus be regarded as being granular in nature, i.e. in the form of irregular beads, spheres, cubes, etc. Any gross departures from a granular nature can result in the moulding composition having undesirable flow properties, for example the heated composition may exhibit a degree of melt elasticity, which is undesirable since it can result in moulding inaccuracies.

Moulding compositions according to the invention may be produced by admixing the styrene-based polymeric material and the PTFE, heating the mixture to form a generally homogeneous plasticised mass of styrene-based polymeric material in which the PTFE particles are uniformly dispersed and granulating said mass.

Moulding compositions according to the invention are of particular utility in forming components of mechanisms adapted for operation in aqueous environments and such components form further aspects of the invention. Particular examples of such components are components of fluid flow meters, especially movable components thereof.

Thus according to a further aspect of the invention there is provided a fluid flow meter comprising a chamber through which in use of the meter fluid being metered passed and a movable component actuable by fluid flow located within said chamber characterised in that at least one of the chamber and the movable component is formed from a styrene-based polymeric material having dispersed therein at least 5% by weight, based on the total weight of the composition of PTFE particles. Preferably the movable component is formed from said styrene-based polymeric material.

The production and testing of moulding compositions according to the invention will now be described in the following Example.

EXAMPLE

High impact polystyrene in granule form was admixed with PTFE particles which were of a granular nature and had an average size between 5 and 7 μm, and containing less than 1% larger than 35 μm. The length:-breadth ratio of the particles was less than 1.5:1.

The PTFE granules were uniformly dispersed in the polystyrene and the admixture heated to form a homogeneous plasticised mass. This mass was passed into a screw extruder heated to a temperature above the softening point of the polystyrene. The resulting extrudate was cooled and chopped into granules suitable for use in moulding operations. Moulding compositions containing 5, 10, 15, 20, 25 and 30% of PTFE particles by weight of the composition were prepared in this way.

Each moulding composition was moulded in a conventional moulding apparatus to form pistons for use in water meters.

A typical piston is illustrated in FIG. 1 of the accompanying drawings and the piston is shown in cross section in FIG. 2. FIG. 3 illustrates a water meter with the piston located within. The piston, generally indicated by the numeral 1, comprises a unitary moulding consisting of a cylindrical peripheral portion 3 and a flat, circular, plate-like portion 5, lying midway between the ends of the cylinder perpendicular to the central longitudinal axis thereof. A short cylindrical moulded stem 7 extends from one side of the plate, in line with the central axis and a metal pin 8 extends on the opposite side of the plate in line with the moulded stem. The plate has a pear shaped opening 9 extending from an axially extending slot 11 formed in cylindrical portion 3, towards the central stem 7. The plate-like portion 5 is provided with a series of circular holes 15 arranged generally symmetrically with relation to opening 9 in a horse-shoe-like pattern. The cylindrical portion has four elongate holes 17, which lie in pairs on opposite sides of the longitudinal slot. These are generally rectangular in shape, with rounded ends, and have their straight edges parallel to the slot.

Measurement of the pistons revealed that all the moulding compositions could be moulded to an accuracy better than 0.1%, and furthermore the moulded pistons were suitable for use in water meters without the need for machining. The pistons were tested in a water meter to see whether they fulfilled the requirements (b) to (e) listed above.

The meter used for the tests is illustrated in FIG. 3 and comprises a chamber housing 38 provided with a water inlet 34. A pressure plate 39 is screwed to the chamber housing and a synthetic rubber 'O' ring seal is clamped between the two parts. A counter housing 36 is located over the pressure plate 39 and is retained by two plastic keys (not shown). The chamber housing 38 houses a thermoplastic chamber unit 40 having inlet and outlet ports (not shown) at the top and bottom of the chamber, respectively. A division shutter 42 within the chamber unit slots into the wall of the unit and extends into the pear shaped opening of piston 1. The pin 8 of the piston engages with a dog drive coupling 44. This in turn engages with a combined reduction gear unit and counter 46, located within the counter housing 36. Motion of the piston in use of the meter is thus transmitted to the counter, which may be read from a visual scale 48. The combined gear unit and counter 46 is brought into sealed engagement with the counter housing 36 by means of a second 'O' ring seal.

The operation of the meter will now be described with reference to FIGS. 4 A–D of the accompanying drawings which diagrammatically illustrate water flow during a single cycle of the piston 1 in the chamber unit 40. The motion of stem 7 of the piston 1 is restricted by a guide comprising a cylindrical guide peg 50 and an outer cylindrical guide portion 52. The guide is connected to and extends upwards from the floor of the chamber unit, and it will be seen that in each cycle the stem 7 of the piston moves in a complete circle around the cylindrical guide peg 50. Division shutter 42 slots into the chamber unit 40 and the guide portion 52, and passes through longitudinal slots 11 of the piston and into the pear-shaped opening of the plate portion. The chamber unit also has an inlet port 54 at the top of the chamber and an outlet port 56 at the bottom. In FIG. 4, water flowing into the chamber is shown dotted, water flowing out is shown hatched, and neutral water, i.e. water which is isolated from the inlet and outlet ports by the piston, is shown by the more lightly dotted shading. In FIG. 4A water flowing into the chamber through inlet port 54 causes the piston to start its eccentric rotary motion, sliding against division shutter 42 and the inner cylindrical wall of chamber unit 40. At the same time, water is expelled from the chamber through outlet port 56.

In FIG. 4B, the piston has moved through a quarter of a cycle. Water continues to flow into the piston, filling most of its volume, and also begins to fill part of the chamber unit, at 58. Water from the remainder of the chamber unit and piston is being expelled through the outlet port. In FIG. 4C, the piston has moved through half of its cycle. The piston is now filled with neutral water 60, and water is entering and leaving the chamber through inlet and outlet ports at sides 62 and 64 respectively of the shutter 42. When three quarters of the cycle has been completed, as shown in FIG. 4D, water is beginning to flow from the inlet port into the piston, leading up to completion of the cycle.

During each cycle of the piston a predetermined quantity of water passes into and out of the meter. The dog drive coupling engaging with the piston pin 8 transmits the piston motion to the reduction gear and counter, which therefore indicates the quantity of water passing through the meter.

As a result of the tests it was found that the pistons formed from each of the moulding compositions described above performed satisfactorily, giving accurate performance even at low flow rates. Also the pistons were resistant to wear and dimensionally stable in water.

Although the use of moulding compositions according to the invention has been particularly described with reference to water meters having movable pistons which execute eccentric rotary motion, other applications are of course possible. Thus, for example, the moulding compositions of the invention may be used in the construction of flow meters in which the fluid-actuated movable component is a swash-plate.

Also they may be used in the construction of other devices which operate in aqueous environments such as for example, pumps.

I claim:

1. A thermoplastic moulding composition comprising a major proportion of a thermoplastic styrene-based polymeric material having dispersed therein at least 5% by weight, based on the total weight of the composition of PTFE particles, said PTFE particles being of a generally granular nature having an average particle size in the range of 1 to 10 μm with not more than 1% of the PTFE particles having sizes greater than 50 μm and wherein the maximum transverse dimension of the PTFE particles does not differ significantly from their minimum dimension, such that the melt elasticity of the composition during moulding does not differ significantly from that of the polymeric material without said PTFE particles.

2. A composition as claimed in claim 1 containing from 5 to 30% by weight, based on the total weight of the composition of said PTFE particles.

3. A composition as claimed in claim 1 containing from 5 to 15% by weight, based on the total weight of the composition of said PTFE particles.

4. A composition as claimed in claim 1 containing from 8 to 12% by weight, based on the total weight of the composition of said PTFE particles.

5. A composition according to claim 1 wherein said PTFE particles have an average particle size in the range of 2 to 10 μm.

6. A composition according to claim 1 wherein said PTFE particles have an average particle size in the range of 5 to 7 μm and not more than 1% have particle sizes greater than 35 μm.

7. A composition according to claim 1 wherein the length:breadth ratio of the particles is not greater than 2:1.

8. A composition according to claim 7 wherein the length:breadth ratio of the particles is not greater than 1.5:1.

9. A composition according to claim 1 wherein the styrene-based polymeric material comprises a high-impact grade of polystyrene.

10. A method of producing a moulding composition according to claim 1 which comprises admixing the styrene-based polymeric material and the PTFE, heating the mixture to form a generally homogeneous plasticized mass of styrene-based polymeric material in which the PTFE particles are uniformly dispersed and granulating said mass.

11. A method according to claim 7 wherein said mass is extruded and the extrudate chopped.

12. A moulded article formed by moulding a composition according to claim 1.

* * * * *